(12) United States Patent
Saito et al.

(10) Patent No.: US 9,946,616 B2
(45) Date of Patent: Apr. 17, 2018

(54) STORAGE APPARATUS

(71) Applicant: HITACHI, LTD., Tokyo (JP)

(72) Inventors: Hideo Saito, Tokyo (JP); Junji Ogawa, Tokyo (JP); Hiroaki Akutsu, Tokyo (JP); Hideyuki Koseki, Tokyo (JP); Atsushi Kawamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 110 days.

(21) Appl. No.: 15/113,511

(22) PCT Filed: Jan. 29, 2014

(86) PCT No.: PCT/JP2014/051889
§ 371 (c)(1),
(2) Date: Jul. 22, 2016

(87) PCT Pub. No.: WO2015/114744
PCT Pub. Date: Aug. 6, 2015

(65) Prior Publication Data
US 2017/0010944 A1 Jan. 12, 2017

(51) Int. Cl.
*G06F 11/20* (2006.01)
*G06F 3/06* (2006.01)

(52) U.S. Cl.
CPC .......... *G06F 11/2094* (2013.01); *G06F 3/064* (2013.01); *G06F 3/0614* (2013.01); *G06F 3/0619* (2013.01); *G06F 3/0653* (2013.01); *G06F 3/0659* (2013.01); *G06F 3/0665* (2013.01); *G06F 3/0688* (2013.01); *G06F 2201/805* (2013.01); *G06F 2201/82* (2013.01)

(58) Field of Classification Search
CPC .................. G06F 11/1068; G06F 11/2094
USPC ........................................... 714/6.22
See application file for complete search history.

(56) References Cited

U.S. PATENT DOCUMENTS

| 6,327,674 B1 | 12/2001 | Ito et al. |
| 8,041,991 B2 | 10/2011 | McKean |
| 2005/0193273 A1* | 9/2005 | Burkey ............... G06F 11/1092 714/42 |
| 2007/0283079 A1 | 12/2007 | Iwamura et al. |
| 2008/0086616 A1* | 4/2008 | Asano .................. G06F 3/0605 711/165 |
| 2008/0162797 A1 | 7/2008 | Teicher et al. |
| 2008/0168304 A1* | 7/2008 | Flynn ..................... G06F 1/183 714/6.12 |

(Continued)

FOREIGN PATENT DOCUMENTS

| JP | 11-176105 A | 7/1999 |
| JP | 2002-073409 A | 3/2002 |

(Continued)

*Primary Examiner* — Chae M Ko
(74) *Attorney, Agent, or Firm* — Volpe and Koenig, P.C.

(57) ABSTRACT

A storage apparatus includes: a plurality of flash memory devices each including: a plurality of flash memory chips each including a plurality of physical blocks being data erasure units; and a flash controller configured to provide logical storage areas by associating at least one of the plurality of physical blocks with the logical storage areas; and a RAID controller configured to: manage a plurality of virtual drives each including a part of the logical storage areas provided by each of the plurality of flash memory devices; and control the plurality of virtual drives as a RAID group.

8 Claims, 14 Drawing Sheets

(56) References Cited

U.S. PATENT DOCUMENTS

| | | |
|---|---|---|
| 2010/0064097 A1 | 3/2010 | Iwamura et al. |
| 2010/0153620 A1 | 6/2010 | McKean et al. |
| 2010/0191908 A1 | 7/2010 | Yamakawa |
| 2010/0241793 A1* | 9/2010 | Sugimoto ............ G06F 11/0793 711/103 |
| 2011/0041039 A1* | 2/2011 | Harari ................. G06F 11/1068 714/773 |
| 2011/0119435 A1 | 5/2011 | Iwamura et al. |
| 2012/0072680 A1* | 3/2012 | Kimura ................. G06F 11/108 711/154 |
| 2012/0173802 A1 | 7/2012 | Iwamura et al. |
| 2013/0103895 A1 | 4/2013 | Iwamura et al. |
| 2013/0346671 A1* | 12/2013 | Michael ............. G06F 12/0246 711/103 |
| 2014/0075240 A1* | 3/2014 | Maeda ................ G06F 11/2069 714/6.23 |
| 2015/0363330 A1* | 12/2015 | Watkins ................ G11C 29/42 714/721 |
| 2016/0004611 A1* | 1/2016 | Lakshman .......... G06F 11/2058 714/6.23 |

FOREIGN PATENT DOCUMENTS

| | | |
|---|---|---|
| JP | 2007-323224 A | 12/2007 |
| JP | 2010-515190 A | 5/2010 |
| JP | 2010-170411 A | 8/2010 |
| JP | 2012-512482 A | 5/2012 |

\* cited by examiner

130

| POOL # | RAID GROUP # | RAID LEVEL | CHUNK # | ASSIGNMENT STATE | VIRTUAL DRIVE # | FMD# |
|---|---|---|---|---|---|---|
| 0 | 0 | 1 | 0 | ASSIGNED | 0, 1 | 0, 1 |
|   |   |   | 1 | UNASSIGNED |   |   |
|   |   |   | 2 | UNASSIGNED |   |   |
|   |   |   | ... |   |   |   |
| ... | ... | ... |   |   | ... | ... |
|   | 4 | 5 | 10 | ASSIGNED | 18, 19, 20, 21 | 19, 20, 21, 22, 27 |
|   |   |   | 11 | ASSIGNED |   |   |
|   |   |   | 12 | UNASSIGNED |   |   |
|   |   |   | ... |   |   |   |
| ... | ... | ... | ... |   | ... | ... |

Fig.13

| VIRTUAL LOGICAL UNIT # | LBA | VIRTUAL CHUNK # | ASSIGNED CHUNK # |
| --- | --- | --- | --- |
| 0 | 0000-0999 | 0 | 11 |
| | 1000-1999 | 1 | UNASSIGNED |
| | 2000-2999 | 2 | 101 |
| | 3000-3999 | 3 | |
| | ... | ... | ... |
| 1 | 0000-0999 | 0 | UNASSIGNED |
| | ... | ... | ... |
| ... | ... | ... | ... |

Fig.14

STORAGE APPARATUS

BACKGROUND

This invention relates to a storage apparatus.

For the purpose of achieving higher performance of a storage apparatus, there is provided a flash memory device (for example, solid state device; hereinafter referred to as "SSD") using a flash memory that enables speedy access as a storage medium. The flash memory device includes a plurality of flash memory chips, and the flash memory chips each include a plurality of physical blocks. The physical blocks are units used for erasing data. In terms of characteristics of the flash memory, there is a limit to the number of times that erasure processing can be conducted for the physical block, and when the number of times of the erasure exceeds the limit, the block can no longer store data. Further, when a physical failure occurs in the flash memory chip, the data can no longer be stored as well. With the recent progress of a micromachining technology for semiconductors, the flash memory chip that enables recording with high density is manufactured, but there is a tendency that an occurrence rate of a failure is increasing and the number of times that the erasure can be conducted for a physical block is decreasing.

As a technology for improving reliability and availability of data storage on the storage apparatus including such a flash memory device, there is a technology that uses a plurality of flash memory devices. In U.S. Pat. No. 8,041, 991 B2, there is disclosed a technology for copying, when a failure is detected in a physical block of a flash memory device, data of the flash memory device including a failed block to a spare flash memory device to replace the flash memory device.

In the technology of U.S. Pat. No. 8,041,991 B2, even when usable physical blocks in which no failure has occurred remain in the flash memory device involving the detected failure, the entire flash memory device needs to be replaced. This raises a problem in that the usable physical blocks that still remain cannot be used effectively.

Patent Literature 1: U.S. Pat. No. 8,041,991 B2

SUMMARY

A storage apparatus includes: a plurality of flash memory devices each including: a plurality of flash memory chips each including a plurality of physical blocks being data erasure units; and a flash controller configured to provide logical storage areas by associating at least one of the plurality of physical blocks with the logical storage areas; and a RAID controller configured to: manage a plurality of virtual drives each including a part of the logical storage areas provided by each of the plurality of flash memory devices; and control the plurality of virtual drives as a RAID group.

This invention produces an effect that, even when a failure occurs in at least one block of a flash memory device, it is possible to continuously use a plurality of blocks that have caused no failure and are capable of storing data.

BRIEF DESCRIPTION OF THE DRAWINGS

FIG. 13 is an example of a structure of a pool management table in the second embodiment.

FIG. 14 is an example of a structure of a virtual logical unit management table in the second embodiment.

DETAILED DESCRIPTION OF THE EMBODIMENTS

First Embodiment

Figure 1:
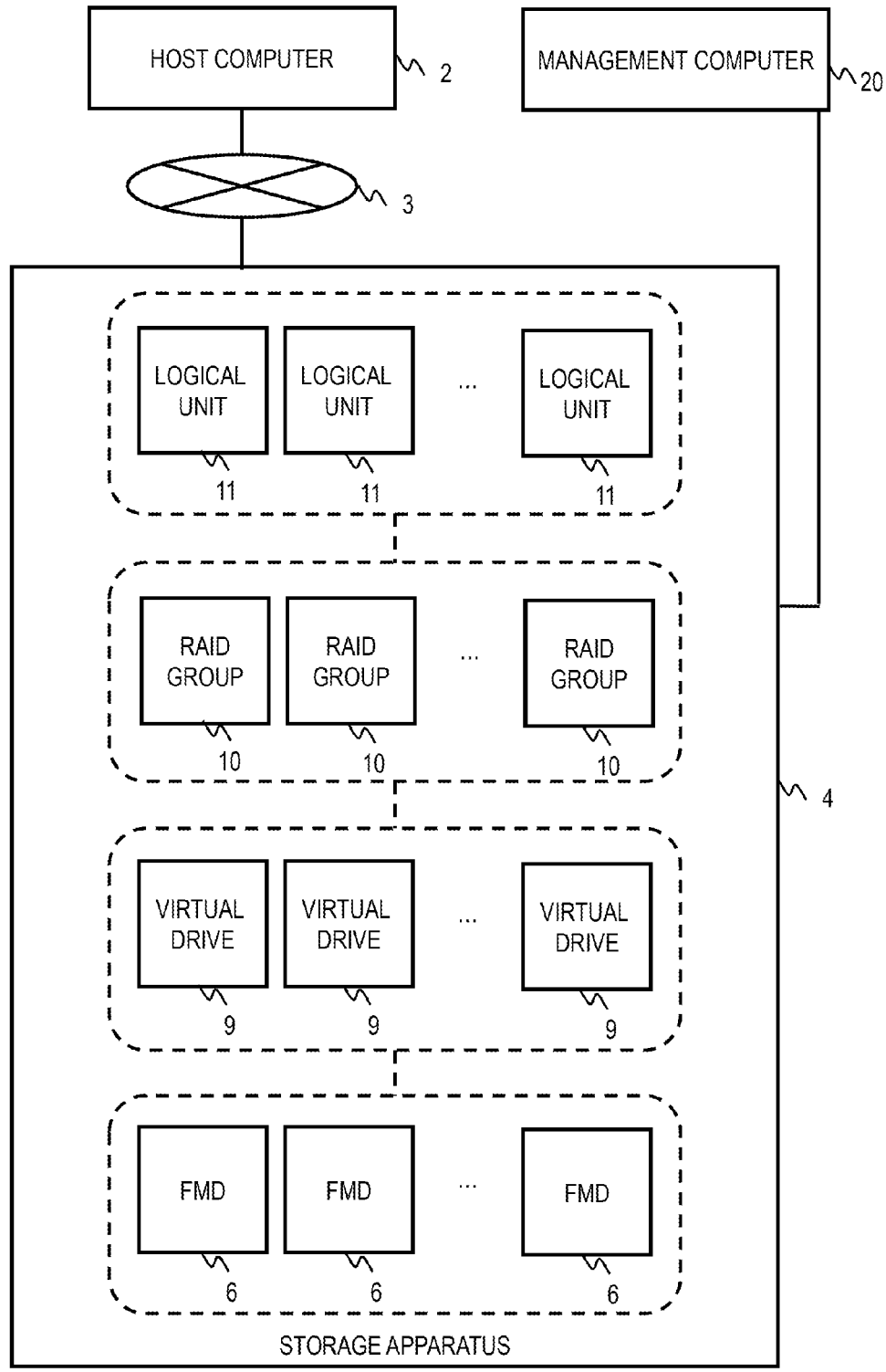
FIG. 1 is a diagram for illustrating an outline of a first embodiment.

FIG. 1 is a diagram for illustrating an outline of a first embodiment of this invention. A storage apparatus 4 is coupled to a host computer 2 through a storage area network (SAN) 3. Further, the storage apparatus 4 is coupled to a management computer 20.

The storage apparatus 4 includes at least one flash memory device (FMD) 6. Each FMD 6 is a device that uses a flash memory as a storage medium.

The storage apparatus 4 has a virtual drive 9 set as an upper storage tier of the FMD 6. At least one virtual drive 9 is set in a storage area provided by the at least one FMD 6. The virtual drive 9 includes a plurality of storage areas, and the respective storage areas are mapped to the storage area of the at least one FMD 6. The mapping from the storage area of the virtual drive 9 to the storage area of the FMD 6 is changed as necessary.

The storage apparatus 4 has a RAID group 10 set as an upper storage tier of the virtual drive 9. At least one RAID group 10 is set in a storage area provided by the at least one virtual drive 9. Data stored in each RAID group 10 is stored on the virtual drive 9 by having redundant data, e.g., a parity, added in redundant array of independent disks (RAID) processing.

The storage apparatus 4 has a plurality of logical units 11 set for all or a part of storage areas included in a RAID group as an upper storage tier of the RAID group 10. The logical units 11 are provided to the host computer 2, and the host computer 2 is configured to conduct reading and writing for the logical units 11.

According to this embodiment, when a part of a physical storage area of a flash memory device fails, it is possible to keep using an area that has not failed by changing a correspondence relationship (mapping) between the storage area of the virtual drive 9 and the storage area of the FMD 6. As a result, the life of the flash memory device becomes longer. In short, it is no longer necessary to frequently replace the flash memory device, which reduces costs for purchase of a new flash memory device and maintenance and replacement of the flash memory device. In particular, in an online transaction processing system, a flash memory device with high access performance can be provided to a user at low cost.

The management computer 20 is a computer including a display apparatus and an input apparatus. The management computer 20 is configured to transmit a setting and an instruction to the storage apparatus 4 and acquire information from the storage apparatus 4 in response to an operation conducted by an administrator. In this embodiment, when there exists no flash memory device at a mapping changing destination, the management computer 20 receives information indicating an alert from the storage apparatus 4.

Figure 2:
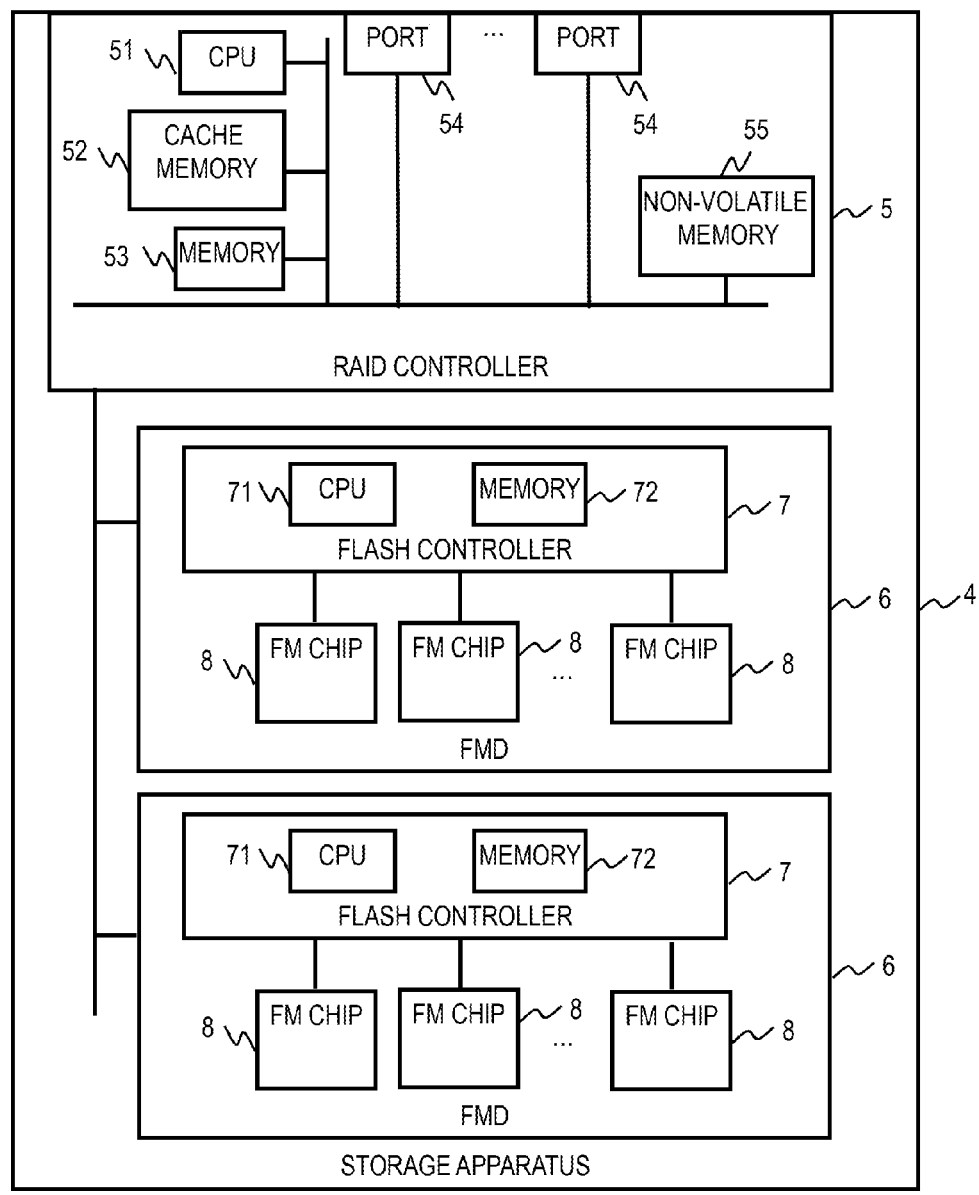
FIG. 2 is a block diagram for illustrating a configuration of a storage apparatus in the first embodiment.

FIG. 2 is a block diagram for illustrating a configuration of the storage apparatus 4. The storage apparatus 4 includes a plurality of FMDs 6 and a RAID controller 5 configured to control input and output of data to and from the FMD 6.

Each FMD 6 includes a plurality of FM chips 8 and a flash controller 7. The FM chip 8 is a non-volatile semiconductor memory. The flash controller 7 includes a CPU 71 and a memory 72, and is configured to control input and output of data to and from the FM chip 8.

The RAID controller 5 includes a CPU 51, a cache memory 52, a memory 53, a plurality of ports 54, and a non-volatile memory 55. The CPU 51 is a processor configured to administer operation control of the entire RAID controller 5, and is configured to read various programs stored in the non-volatile memory 55 into the memory 53, and execute the various programs. The memory 53 is used for storing the various programs read from the non-volatile memory 55 by the CPU 51, and is also used as a work memory for the CPU 51. The cache memory 52 is mainly used for temporarily storing data exchanged between the host computer 2 and the FMD 6. Each port 54 is an adapter for coupling the storage apparatus 4 to the SAN 3.

Figure 3:
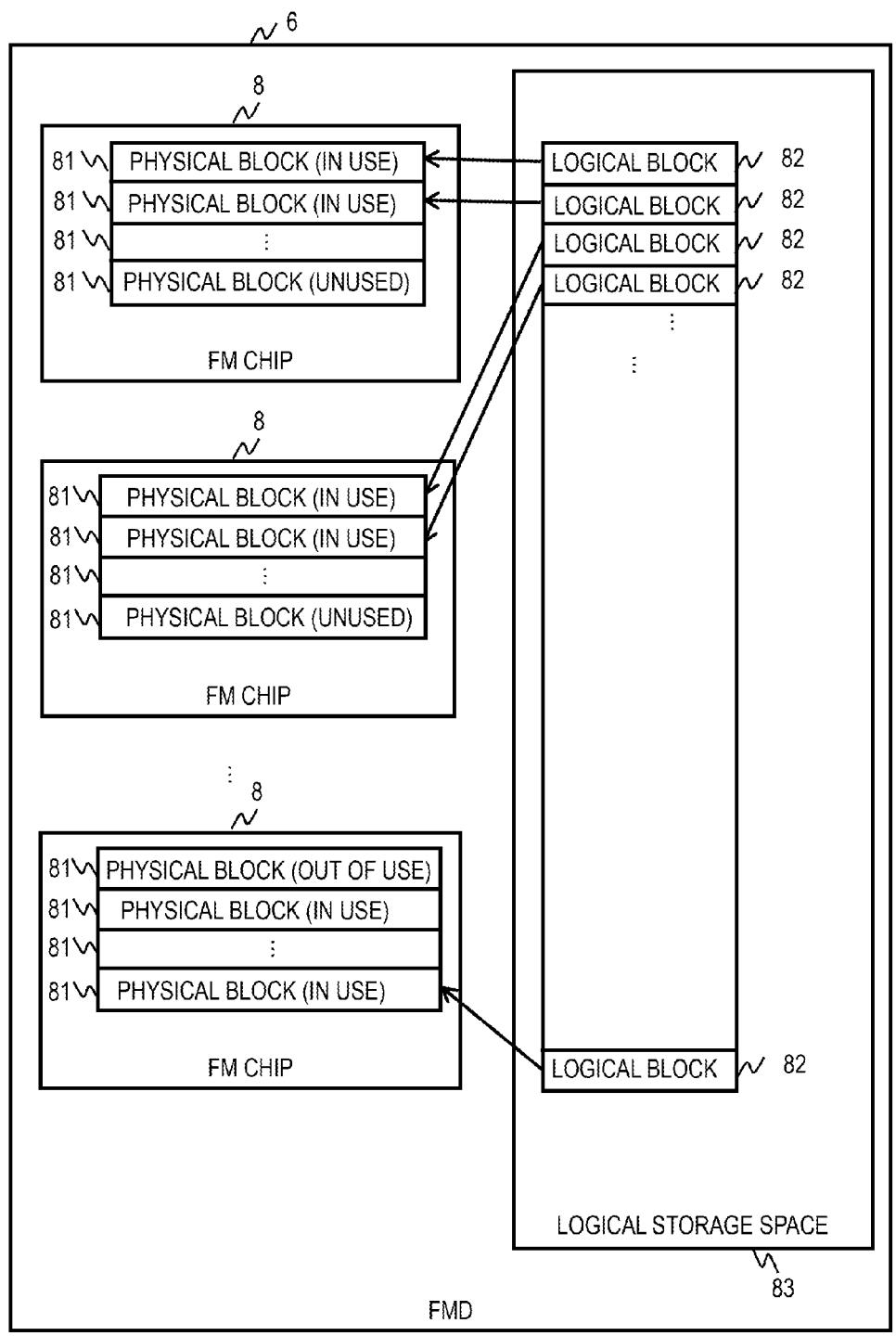
FIG. 3 is a conceptual illustration of a method of managing a storage area internally by a flush memory device in the first embodiment.

FIG. 3 is a conceptual illustration of a method of managing a storage area internally by the FMD 6. Each FM chip 8 of the FMD 6 includes a plurality of physical blocks 81. Each physical block 81 is a storage area having a fixed size, and the size is, for example, 2 megabytes. In the flash memory, the physical block is a storage area being a unit used for collectively erasing data. Rewriting of data in the flash memory involves erasure of the data in each physical block. In terms of characteristics of the flash memory, when the erasure of the data in the physical block is executed, the physical block deteriorates. After the physical block deteriorates, an occurrence rate of an error in the stored data increases, and after the erasure is repeated, the block becomes unable to store data. As described above, there is a limit to the number of times that erasure is allowed for the physical block. It should be noted that the number of times that data is written into the block may be managed instead of the number of times of erasure.

Further, each physical block includes a plurality of physical pages. Each physical page is a storage area having a fixed size, and the size is, for example, 8 kilobytes. In the flash memory, the physical page is a storage area being a unit used for writing and reading data. The flash memory has a characteristic that data cannot be overwritten, and hence when data stored in a given physical page is updated, the data is written into another physical page. Therefore, the FMD 6 includes an excess area (hereinafter referred to as "update area") for writing of update data.

The flash controller 7 of the FMD 6 provides a logical storage space to the RAID controller 5 provided outside the FMD 6. The flash controller 7 is further configured to manage a plurality of logical blocks by segmenting the logical storage space into predetermined sizes. In this embodiment, the flash controller 7 is assumed to provide the logical storage space to the outside in units of logical blocks. However, a management unit for the logical storage space provided to the outside by the flash controller 7 may be different from a logical block unit being an internal management unit. For example, the flash controller 7 may provide the logical storage space to the RAID controller 5 in units of 512 bytes. In this case, the RAID controller 5 accesses the FMD 6 by specifying an address in units of 512 bytes. Then, the flash controller 7 identifies the logical block corresponding to the address specified by the RAID controller 5, and accesses the physical block mapped to the logical block.

The physical block 81 has respective states of "in use", "unused", and "out of use". The FMD 6 provides an in-use physical block 81 to the outside through the logical block 82 mapped to the in-use physical block 81. Specifically, when receiving an input/output request, e.g., a read request or a write request, from the RAID controller 5, the FMD 6 obtains the logical block 82 to be input or output based on a parameter included in the input/output request, and inputs or outputs data to or from the physical block 81 to which the logical block 82 is mapped. The mapping between the logical block 82 and the physical block 81 is managed based on a table within the memory 72. In this embodiment, the mapping in units of blocks is described, but mapping in units of pages between a logical page and a physical page may be conducted. An unused block represents a physical block from which data has been erased and in which no failure or the like has occurred, and is managed as the update area. In short, the update area is a set of unused blocks. An out-of-use block represents a block exhibiting the number of times of erasure exceeding a threshold value or a block that has become unable to store data due to a physical failure or the like of an FM chip.

The memory 72 of the FMD 6 stores the numbers of physical blocks 81 in the respective states of "in use", "unused", and "out of use". When there is a change in the state of the physical block 81, the CPU 71 updates the numbers of physical blocks 81 in the respective states, which are stored in the memory 72.

The FMD 6 changes the mapping from the logical block 82 to the physical block 81 as necessary. For example, when the physical block 81 reaches a predetermined upper limit of the number of times of writing, the FMD 6 copies data within the physical block 81 to an unused physical block 81, and changes a mapping destination of the logical block 82 mapped to the original physical block 81 to the physical block 81 of a copy destination. At that time, the FMD 6 changes the state of the original physical block 81 from "in use" to "out of use", and changes the state of the physical block 81 of the copy destination from "unused" to "in use".

Figure 4:
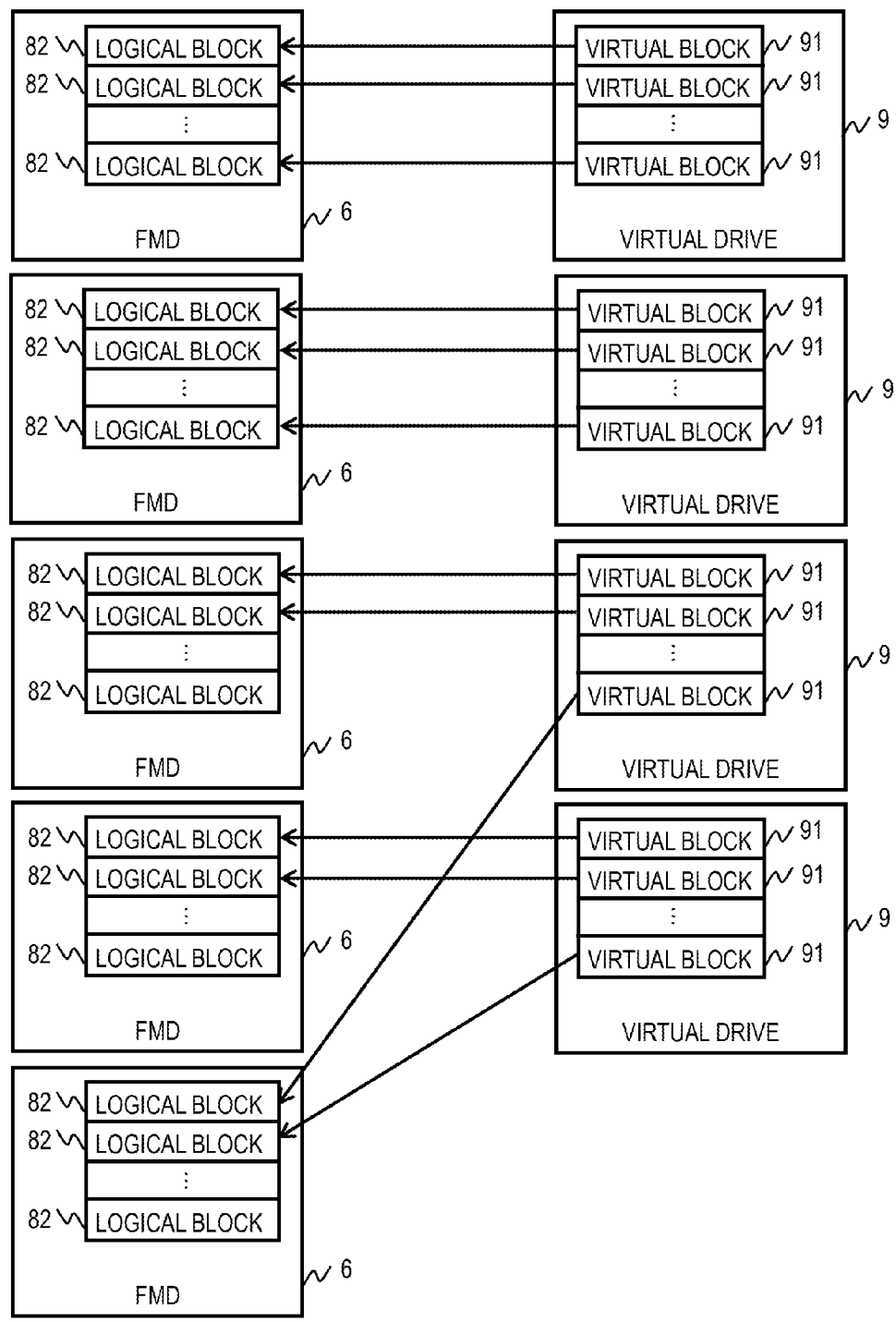
FIG. 4 is a conceptual illustration of a method of managing a storage area internally by a RAID controller in the first embodiment.

FIG. 4 is a conceptual illustration of a method of managing a storage area internally by the RAID controller 5. The RAID controller 5 refers to a table within the memory 53 described later to manage the storage area of at least one FMD 6 as at least one virtual drive 9. The virtual drive 9 includes a plurality of virtual blocks 91. In this embodiment, each virtual block 91 is a storage area having a fixed size, and the size is set the same as the size of the physical block 81. However, when at least one physical page within each physical block is managed as the update area, a size excluding the size of the update area may be set as the size of the virtual block. The RAID controller 5 refers to the table within the memory 53 described later to map each virtual block 91 to any one of the logical blocks 82. The plurality of virtual blocks 91 of one virtual drive 9 may be mapped to the logical blocks 82 of the FMDs 6 that are different from one another.

Figure 5:
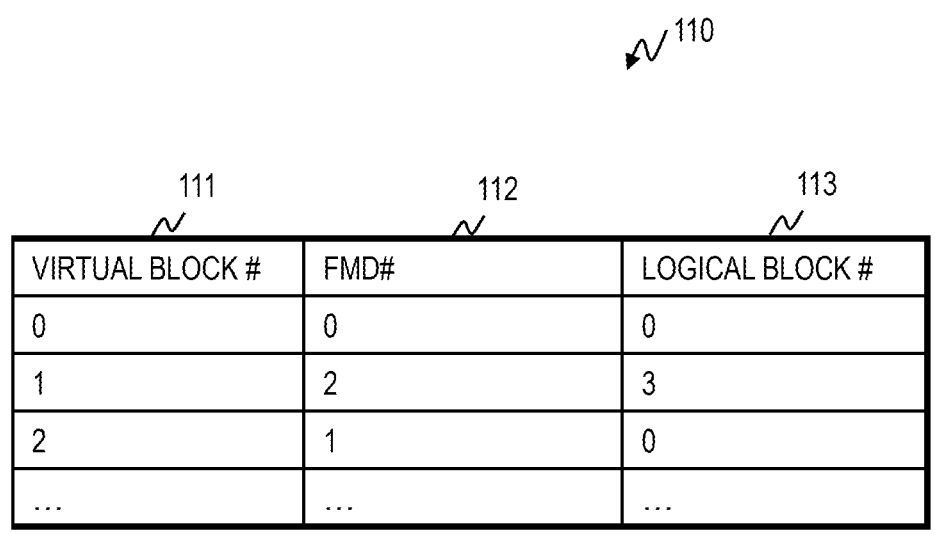
FIG. 5 is an example of a structure of a virtual drive management table in the first embodiment.

FIG. 5 is an example of a structure of a virtual drive management table 110 being a table held within the memory 53 for managing the virtual drive 9 by the RAID controller 5. The RAID controller 5 holds the virtual drive management table 110 for each virtual drive 9. In the virtual drive management table 110, a virtual block #111, an FMD #112, and a logical block #113 are registered for each virtual block 91.

The virtual block #111 is a number used for uniquely specifying the virtual block 91 within the virtual drive 9.

The FMD #112 is a number used for uniquely identifying, within the storage apparatus 4, the FMD 6 including the logical block 82 to which the virtual block 91 identified by the virtual block #111 is mapped.

The logical block #113 is a number used for uniquely identifying, within the FMD 6, the logical block 82 to which the virtual block 91 identified by the virtual block #111 is mapped. In the logical block #113, the range of a logical address corresponding to a logical block within a logical address space provided by the FMD 6 may be registered instead of the number of logical blocks 82.

Figure 6:
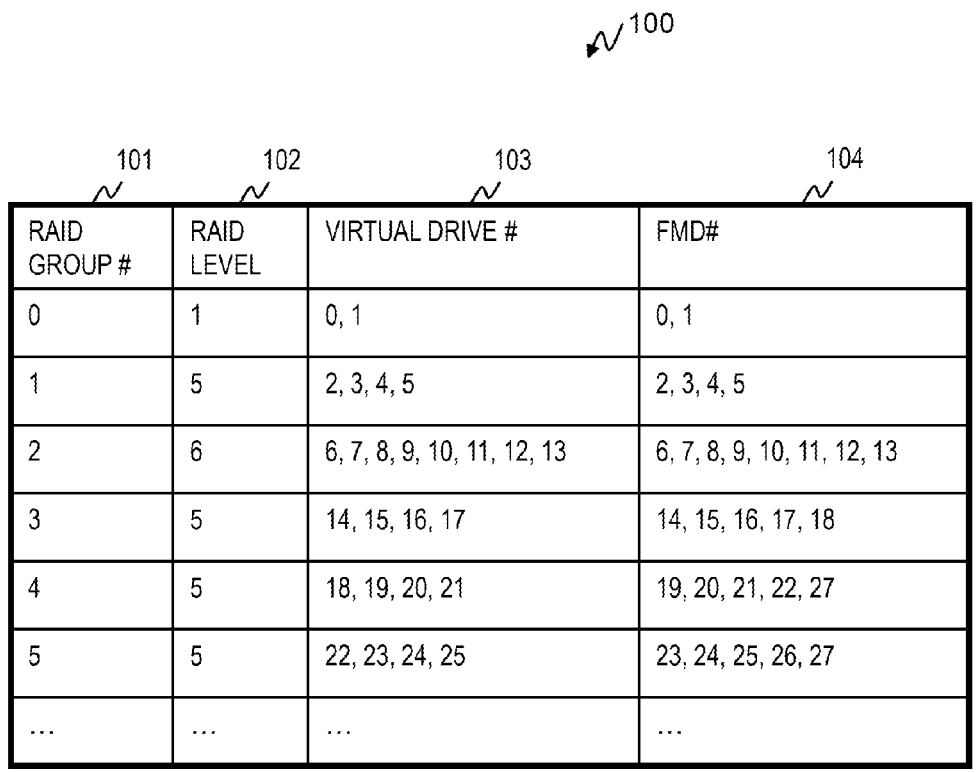
FIG. 6 is an example of a structure of a RAID group management table in the first embodiment.

FIG. 6 is an example of a structure of a RAID group management table 100 being a table used for RAID processing being processing for improving reliability and availability of data, which is conducted by the RAID controller 5. In the RAID group management table 100, a RAID group #101, a RAID level 102, a virtual drive #103, and an FMD #104 are registered.

The RAID group #101 is a number used for uniquely identifying the RAID group 10 within the storage apparatus 4.

The RAID level 102 is a value used for identifying a method of adding redundant data in the RAID processing. Examples of the RAID level 102 include "RAID-1", "RAID-5", and "RAID-6". When the RAID level 102 is "RAID-1", the RAID controller 5 mirrors data stored in the RAID group 10 to two virtual drives 9. When the RAID level 102 is "RAID-5", the RAID controller 5 calculates one parity for a plurality of pieces of data stored in the RAID group, and stores the respective pieces of data and the parity relating thereto in the virtual drives 9 that are different from one another. In this embodiment, the plurality of pieces of data and the parity calculated based on the plurality of pieces of data are referred to as "stripe". When the RAID level 102 is "RAID-6", the RAID controller 5 calculates two parities for a plurality of pieces of data stored in the RAID group 10, and stores the respective pieces of data and the two parities relating thereto in the virtual drives 9 that are different from one another.

The virtual drive #103 is a number used for identifying, within the storage apparatus 4, each of the virtual drives 9 that form the RAID group 10 identified by the RAID group #101. The number of virtual drives #103 registered for one RAID group #101 differs depending on the RAID level 102 registered for the one RAID group #101. For example, when the RAID level 102 is "RAID-1", an even number of virtual drives #103 are registered. When the RAID level 102 is "RAID-5", at least three virtual drives #103 are registered. When the RAID level 102 is "RAID-6", at least four virtual drives #103 are registered.

The FMD #104 is a number used for identifying, within the storage apparatus 4, the FMD 6 including the logical block 82 to which the virtual block 91 of the virtual drive 9 identified by the virtual drive #103 can be mapped. A larger number of FMDs #104 than the number of virtual drives #103 may be registered for one RAID group #101.

Figure 7:
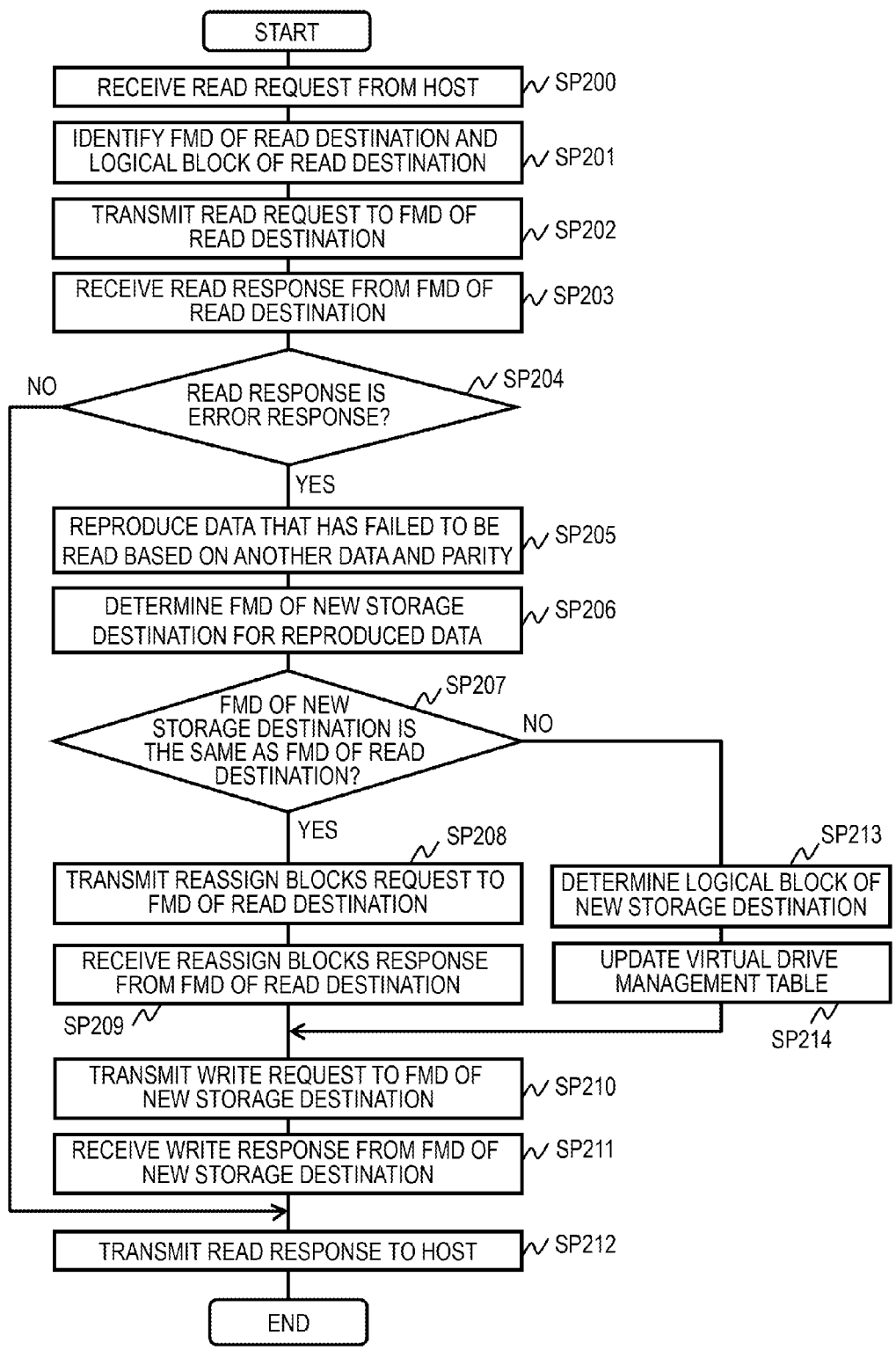
FIG. 7 is a flowchart for illustrating host read processing in the first embodiment.

FIG. 7 is a flowchart for illustrating processing (host read processing) conducted by the RAID controller 5 when receiving a read request from the host computer 2. The host read processing is achieved when the CPU 51 of the RAID controller 5 executes a program.

When receiving a read request from the host computer 2 (SP200), the RAID controller 5 first identifies the FMD 6 and the logical block 82 of a read destination (SP201).

Specifically, the RAID controller 5 first extracts, from the received read request, information (for example, address) for identifying the logical unit of the read destination and an area of the read destination within the logical unit, and identifies the virtual drive 9 and the virtual block 91 of the read destination based on the extracted information. Subsequently, the RAID controller 5 refers to the virtual drive management table 110 corresponding to the identified virtual drive 9 to identify an entry in which the number for identifying the identified virtual block 91 is registered as the virtual block #111. Then, the RAID controller 5 extracts the FMD #112 and the logical block #113 from the identified entry.

Subsequently, the RAID controller 5 transmits a read request for reading the logical block 82 identified in Step SP201 to the FMD 6 identified in Step SP201 (SP202).

Subsequently, the RAID controller 5 receives a response to the read request transmitted in Step SP202 from the FMD 6 identified in Step SP201 (SP203). When the read data is included in the response to the read request, the RAID controller 5 stores the read data in the cache memory 52.

Subsequently, the RAID controller 5 determines whether or not the response received in Step SP203 is an error response (SP204).

When obtaining a positive result in the above-mentioned determination (YES in SP204), the RAID controller 5 advances to Step SP205. The obtained positive result means that the physical block 81 to which the logical block 82 identified in Step SP201 is mapped has failed. At this time, the RAID controller 5 identifies the FMD 6 and the logical block 82 that store another data and the parity within the same stripe relating to the data of the logical block 82, which has failed to be read, in the same manner as in the processing of Step SP201, and reads the other data and the parity from each FMD. Then, the RAID controller 5 reproduces the data that has failed to be read based on the other data and the parity, and stores the data in the cache memory 52.

Subsequently, the RAID controller 5 determines the FMD 6 of a new storage destination for the reproduced data by new-storage-destination FMD determination processing described later (SP206).

Subsequently, the RAID controller 5 determines whether or not the FMD 6 of the new storage destination determined in Step SP206 is the same as the FMD 6 of the identified read destination (SP207).

When receiving a positive result in the above-mentioned determination (YES in SP207), the RAID controller 5 advances to Step SP208. The obtained positive result means that a larger number of unused physical blocks 81 than a predetermined threshold value remain in the FMD 6 of the read destination. At this time, in order to instruct the FMD 6 of the read destination to change the mapping destination of the logical block 82 to the unused physical block 81, the RAID controller 5 transmits a REASSIGN BLOCKS request to the FMD 6 of the read destination.

Subsequently, the RAID controller 5 receives a response to the REASSIGN BLOCKS request transmitted in Step SP208 (SP209), and advances to Step SP210.

Meanwhile, when obtaining a negative result in the determination of Step SP207 (NO in SP207), the RAID controller 5 advances to Step SP213. The obtained negative result means that the reproduced data is to be stored in an FMD 6 different from the FMD 6 of the read destination identified in Step SP201. At this time, the RAID controller 5 determines the logical block 82 of the new storage destination from among the logical blocks 82 included in the FMD 6 of the new storage destination determined in Step SP206.

Subsequently, the RAID controller 5 updates the virtual drive management table 110 based on a result of the determination of Step SP213 (SP214). Specifically, the RAID controller 5 refers to the virtual drive management table 110 corresponding to the virtual drive 9 identified in Step SP201 to identify an entry corresponding to the virtual block 91 identified in Step SP201. Then, the RAID controller 5 sets the FMD #112 of the identified entry to the number for identifying the FMD 6 of the new storage destination determined in Step SP206, and sets the logical block #113 to the number for identifying the logical block 82 of the new storage destination determined in Step SP213. With this configuration, it is possible to keep using a block that has not failed within an FMD, and even when the number of failed blocks increases, it is possible to keep using the FMD without blocking the FMD.

After finishing Step SP214, the RAID controller 5 advances to Step SP210.

The RAID controller 5 advances to Step SP210 to transmit a write request for writing the reproduced data to the FMD 6 of the new storage destination determined in Step SP206.

Subsequently, the RAID controller 5 receives a response to the write request transmitted in Step SP210 (SP211), and advances to Step SP212.

Meanwhile, when obtaining a negative result in the determination of Step SP204 (NO in SP204), the RAID controller 5 advances to Step SP212.

The RAID controller 5 advances to Step SP212 to transmit a response to the read request received in Step SP200 to the host computer 2 (SP212), and brings the host read processing to an end. In Step SP210 of the above-mentioned host read processing, the RAID controller 5 writes the data reproduced in Step SP205 to the FMD 6 of the new storage destination, but may leave the reproduced data in the cache memory 52 as dirty data without conducting the writing. In that case, the reproduced data is written to the FMD 6 of the new storage destination by destaging processing described later.

Further, in Step SP208 of the above-mentioned host read processing, the RAID controller 5 changes the mapping destination of the logical block 82 that failed in the reading in Step SP202, but may change the logical block 82 to which the virtual block 91 is to be mapped without changing the mapping destination. In that case, the RAID controller 5 determines the logical block 82 of the new storage destination from among the logical blocks 82 included in the FMD 6 of the read destination. Then, the RAID controller 5 updates the virtual drive management table 110 in the same procedure as in Step SP214.

Figure 8:
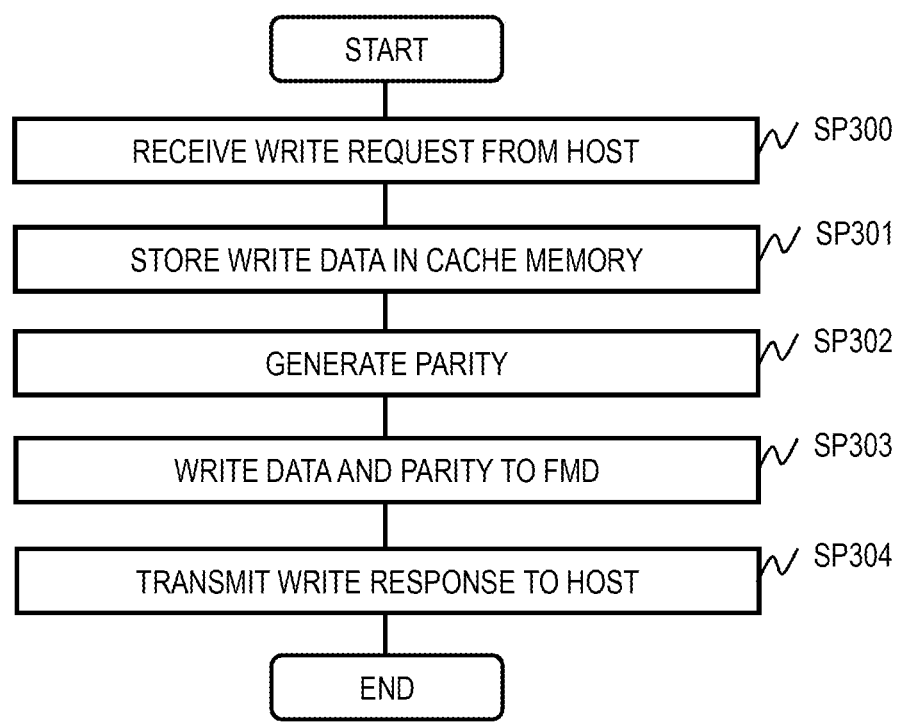
FIG. 8 is a flowchart for illustrating host write processing in the first embodiment.

FIG. 8 is a flowchart for illustrating processing (host write processing) conducted by the RAID controller 5 when receiving a write request from the host computer 2. The host write processing is achieved when the CPU 51 of the RAID controller 5 executes a program.

When receiving a write request from the host computer 2 (SP300), the RAID controller 5 first stores write data in the cache memory 52 (SP301).

Specifically, the RAID controller 5 first extracts, from the received write request, information for identifying the logical unit of the write destination and an area of the write destination within the logical unit, and identifies the RAID group 10 and the virtual block of the write destination of the RAID group 10 based on the extracted information. Then, the RAID controller 5 stores the write data in the cache memory 52, and sets information for managing the stored write data in a table within the memory 53. The information includes the number for identifying the RAID group 10 of the write destination and the number for identifying the block of the write destination within the RAID group 10.

Subsequently, the RAID controller 5 calculates a parity relating to the write data, and stores the parity in the cache memory 52. There are various methods of calculating the parity. For example in the case of RAID-5, there is a method of calculating an exclusive logical OR of all pieces of data within the stripe relating to the parity to be calculated.

Subsequently, the RAID controller 5 writes the write data and the parity to the FMD 6 by the destaging processing described later (SP303).

Finally, the RAID controller 5 transmits a response to the write request received in Step SP300 to the host computer 2 (SP304), and brings the host write processing to an end.

In the above-mentioned host write processing, the RAID controller 5 writes the write data to the FMD 6 before returning the response to the write request to the host computer 2 (writing through), but may return the response to the host computer 2 without writing the write data to the FMD 6 (writing back). In that case, the RAID controller 5 leaves the write data in the cache memory 52 as dirty data without writing the write data to the FMD 6, and writes the write data to the FMD 6 in the destaging processing described later.

Figure 9:
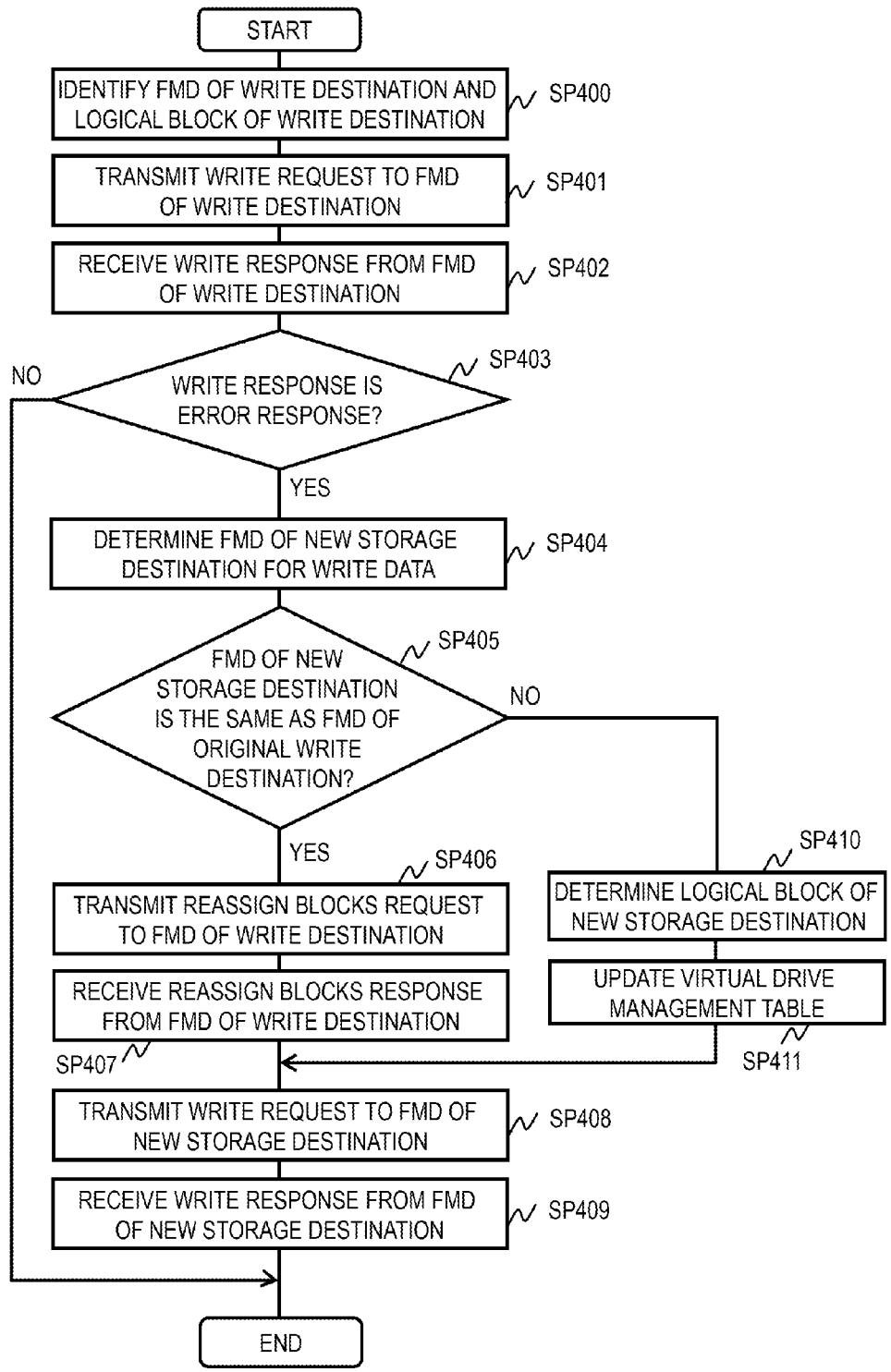
FIG. 9 is a flowchart for illustrating destaging processing in the first embodiment.

FIG. 9 is a flowchart for illustrating processing (destaging processing) conducted when the RAID controller 5 destages the data or parity stored in the cache memory 52 to the FMD 6. The destaging processing is achieved when the CPU 51 of the RAID controller 5 executes a program.

When processing the write request by the writing through, the RAID controller 5 executes the destaging processing before transmitting a response to the write request. Meanwhile, when processing the write request by the writing back, the RAID controller 5 periodically executes the destaging processing asynchronously with the write request.

In the destaging processing, the RAID controller 5 first identifies the FMD 6 and the logical block 82 of the write destination (SP400). Specifically, the RAID controller 5 first refers to the table within the memory 53 for managing the write data stored in the cache memory 52 to respectively identify the RAID group 10 of the write destination of the data to be destaged and the block of the write destination within the RAID group 10. Subsequently, the RAID controller 5 identifies the virtual drive 9 and the virtual block 91 of the write destination based on the identified information. Subsequently, the RAID controller 5 identifies the FMD 6 and the logical block 82 corresponding to the virtual drive 9 and the virtual block 91 that have been identified. Specifically, the RAID controller 5 refers to the virtual drive management table 110 corresponding to the identified virtual drive 9 to extract the FMD #112 and the logical block #113 from a record in which the number for identifying the identified virtual block 91 is registered as the virtual block #111.

Subsequently, the RAID controller 5 transmits, to the FMD 6 identified in Step SP400, the write request for writing the data or parity to be destaged to the logical block 82 identified in Step SP400 (SP401).

Subsequently, the RAID controller 5 receives a response to the write request transmitted in Step SP401 from the FMD 6 identified in Step SP400 (SP402).

Subsequently, the RAID controller 5 determines whether or not the write request received in Step SP403 is an error response (SP403).

When obtaining a positive result in the above-mentioned determination (YES in SP403), the RAID controller 5 advances to Step SP404. The obtained positive result means that the physical block 81 to which the logical block 82 identified in Step SP400 is mapped has failed. At this time, the RAID controller 5 identifies the FMD 6 of a new storage destination for the data to be destaged by new-storage-destination FMD determination processing described later.

Subsequently, the RAID controller 5 determines whether or not the FMD 6 of the write destination determined in Step SP404 is the same as the FMD 6 of the identified write destination determined in Step S400 (SP405).

When receiving a positive result in the above-mentioned determination (YES in SP405), the RAID controller 5 advances to Step SP406. The obtained positive result means that a larger number of unused physical blocks 81 than a predetermined threshold value remain in the FMD 6 of the write destination. At this time, in order to instruct the FMD 6 of the write destination to change the mapping destination of the logical block 82 to the unused physical block 81, the RAID controller 5 transmits a REASSIGN BLOCKS request to the FMD 6 of the write destination.

Subsequently, the RAID controller 5 receives a response to the REASSIGN BLOCKS request transmitted in Step SP406 (SP407), and advances to Step SP408.

Meanwhile, when obtaining a negative result in the determination of Step SP405 (NO in SP405), the RAID controller 5 advances to Step SP410. The obtained negative result means that the data to be destaged is to be stored in the FMD 6 different from the FMD 6 of the write destination identified in Step SP400. At this time, the RAID controller 5 determines the logical block 82 of the new storage destination from among the logical blocks 82 included in the FMD 6 of the new storage destination determined in Step SP404. Further, the RAID controller 5 acquires a remaining physical capacity of a physical storage area that can store data from the FMD 6 of the write destination identified in Step SP400, and when the remaining physical capacity is smaller than a threshold value, manages the logical block 82 identified in Step SP400 as a logical block that cannot be used. For example, when the remaining capacity is smaller than the capacity of a logical storage area, even after receiving data from the RAID controller 5, the FMD 6 cannot store the received data in the flash memory, and therefore transmits an error response to the RAID controller 5. Therefore, by managing the logical block as being unable to be used in advance, it is possible to reduce unnecessary communication overhead between the RAID controller 5 and the FMD 6.

Subsequently, the RAID controller 5 updates the virtual drive management table 110 based on a result of the determination of Step SP410 (SP411). Specifically, the RAID controller 5 refers to the virtual drive management table 110 corresponding to the virtual drive 9 identified in Step SP400 to identify an entry corresponding to the virtual block 91 identified in Step SP400. Then, the RAID controller 5 sets the FMD #112 of the identified entry to the number for identifying the FMD 6 of the new storage destination determined in Step SP404, and sets the logical block #113 to the number for identifying the logical block 82 of the new storage destination determined in Step SP410. With this configuration, it is possible to keep using a block that has not failed within an FMD, and even when the number of failed blocks increases, it is possible to keep using the FMD without blocking the FMD.

After finishing Step SP411, the RAID controller 5 advances to Step SP408.

The RAID controller 5 advances to Step SP408 to transmit a write request for writing the data to be destaged to the FMD 6 of the new storage destination determined in Step SP404.

Subsequently, the RAID controller 5 receives the response to the write request transmitted in Step SP408 from the FMD 6 determined in Step SP405 (SP409), and brings the destaging processing to an end.

Meanwhile, when obtaining a negative result in the determination of Step SP403 (NO in SP403), the RAID controller 5 brings the destaging processing to an end.

In Step SP406 of the above-mentioned destaging processing, the RAID controller 5 changes the mapping destination of the logical block 82 that failed in the writing in Step SP401, but may change the logical block 82 to which the virtual block 91 is to be mapped without changing the mapping destination. In that case, the RAID controller 5 determines the logical block 82 of the new storage destination from among the logical blocks 82 included in the FMD 6 of the write destination. Then, the RAID controller 5 updates the virtual drive management table 110 in the same procedure as in Step SP411.

Figure 10:
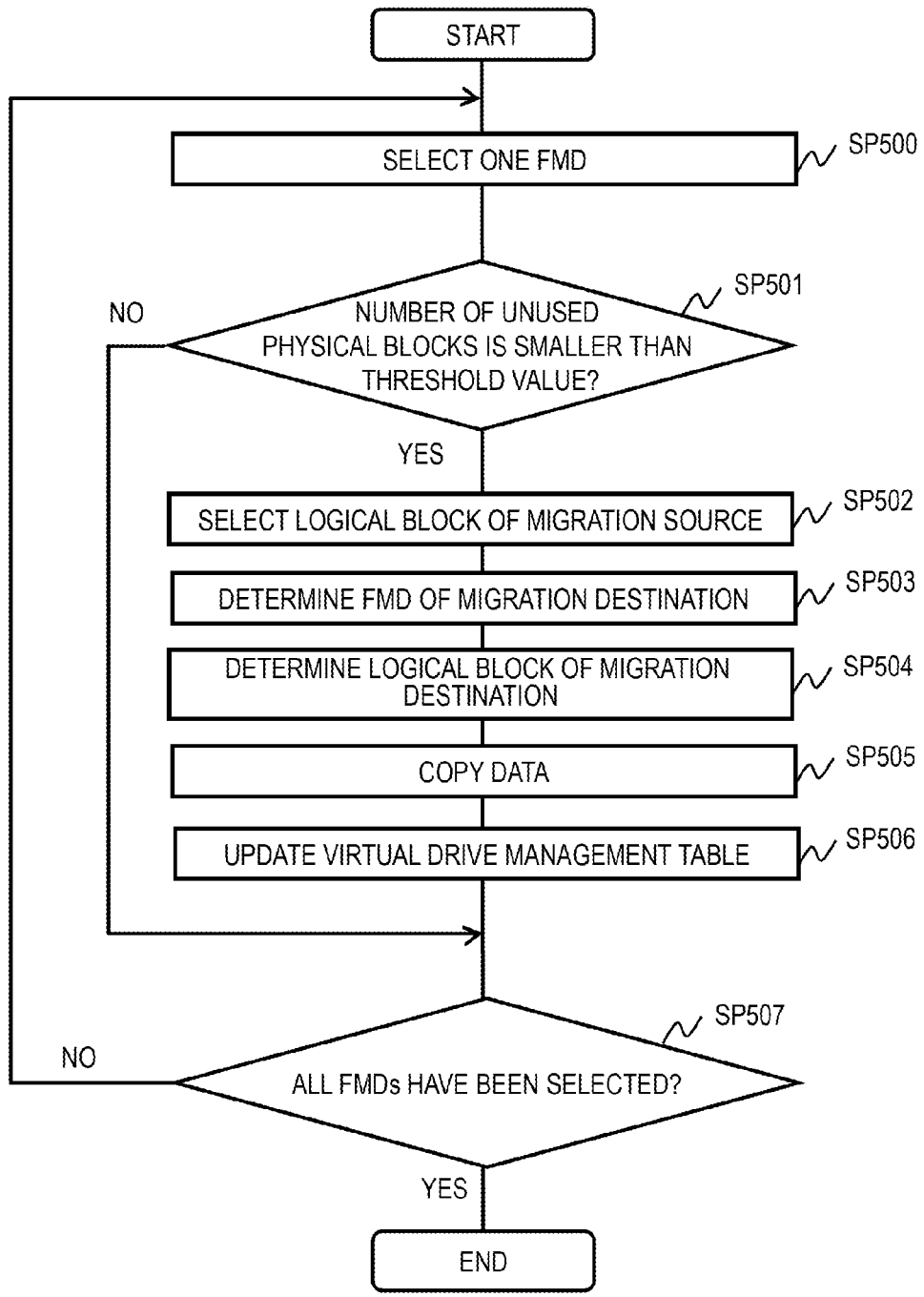
FIG. 10 is a flowchart for illustrating unused block leveling processing in the first embodiment.

FIG. 10 is a flowchart for illustrating processing (unused block leveling processing) conducted periodically by the RAID controller 5 in order to level a ratio among the unused physical blocks 81 of the respective FMDs 6 within the storage apparatus 4. The unused block leveling processing is achieved when the CPU 51 of the RAID controller 5 executes a program. When there is a bias in the number of unused physical blocks among FMDs, variations occur in performance among the FMDs. In short, access is focused on an FMD having a large number of in-use physical blocks, and the performance of a specific FMD deteriorates. The unused block leveling processing allows such variations in the performance among the FMDs to be leveled. Further, the unused block leveling processing allows the number of unused blocks to be leveled in advance. With this configuration, it is possible to lower a probability that data needs to be copied to another FMD along with the host read or write processing, and it is possible to avoid a delay in the response to the read or write request from the host computer.

In the unused block leveling processing, the RAID controller 5 first selects one FMD 6 within the storage apparatus 4 (SP500).

Subsequently, the RAID controller 5 determines whether or not the number of unused physical blocks 81 of the FMD 6 selected in Step SP500 is smaller than a threshold value (SP501). Specifically, the RAID controller 5 queries the number of unused physical blocks 81 from the FMD 6 selected in Step SP500 to acquire the number of unused physical blocks 81 from the FMD 6, and determines whether or not the number of unused physical blocks 81 is smaller than a predetermined threshold value. When the FMD 6 receives the query from the RAID controller 5, the CPU 71 of the FMD 6 reads the number of unused physical blocks 81 from the memory 72, and transmits the number to the RAID controller 5.

When obtaining a positive result in the above-mentioned determination (YES in SP501), the RAID controller 5 advances to Step SP502. Then, the RAID controller 5 selects one logical block 81 of a migration source from among the logical blocks 82 included in the FMD 6 selected in Step SP500.

Subsequently, the RAID controller 5 determines the FMD 6 of a migration destination by the new-storage-destination FMD determination processing described later (SP503).

Subsequently, the RAID controller 5 determines the logical block 82 of the migration destination from among the logical blocks 82 included in the FMD 6 of the migration destination determined in Step SP503 (SP504).

Subsequently, the RAID controller 5 copies the data of the logical block 81 of the migration source selected in Step SP502 to the logical block 82 of the migration destination determined in Step SP504 (SP505).

Subsequently, the RAID controller 5 updates the virtual drive management table 110 (SP506). Specifically, the RAID controller 5 refers to the virtual drive management table 110 corresponding to the virtual drive 9 including the virtual block 91 mapped to the logical block 82 of the migration source to identify an entry corresponding to the virtual block 91 mapped to the logical block 82 of the migration source. Then, the RAID controller 5 sets the FMD #112 of the identified entry as the number for identifying the FMD 6 of the migration destination, and sets the logical block #113 as the number for identifying the logical block 82 of the migration destination.

After finishing Step SP506, the RAID controller 5 advances to Step SP507.

Meanwhile, when obtaining a negative result in the determination of Step SP501 (NO in SP501), the RAID controller 5 advances to Step SP507.

The RAID controller 5 advances to Step SP507 to determine whether or not all the FMDs 6 within the storage apparatus 4 have been selected.

When obtaining a positive result in the above-mentioned determination (YES in SP507), the RAID controller 5 brings the unused block leveling processing to an end.

Meanwhile, when obtaining a negative result in the determination of Step SP507 (NO in SP507), the RAID controller 5 advances to Step SP500.

In the above-mentioned unused block leveling processing, the RAID controller 5 serves as a main component to search for the FMD 6 having a smaller number of unused physical blocks 81 than the threshold value, but the FMD 6 may serve as a main component to notify the RAID controller 5 when the number of unused physical blocks 81 is smaller than the threshold value. In that case, when receiving the notification from the FMD 6, the RAID controller 5 conducts the processing from Step SP502 to Step SP506. The FMD 6 may check the number of unused physical blocks with a trigger that a failure in the FM chip is detected, and may notify the RAID controller 5 of the information indicating that the failure has occurred. When the FM chip fails, the number of usable physical blocks greatly decreases, and the variations in the number of unused physical blocks among FMDs also become larger. Therefore, when the FMD 6 notifies the RAID controller 5 of the failure in the FM chip at a timing at which the failure is detected, the RAID controller 5 can execute the unused block leveling processing at an early stage. The failure in the FM chip represents, for example, a physical failure in a control circuit or a wiring on the FM chip. When a failure occurs in the control circuit on the FM chip, data can no longer be read from or written to the physical block on the FM chip, and hence all the physical blocks become unable to be used.

Figure 11:
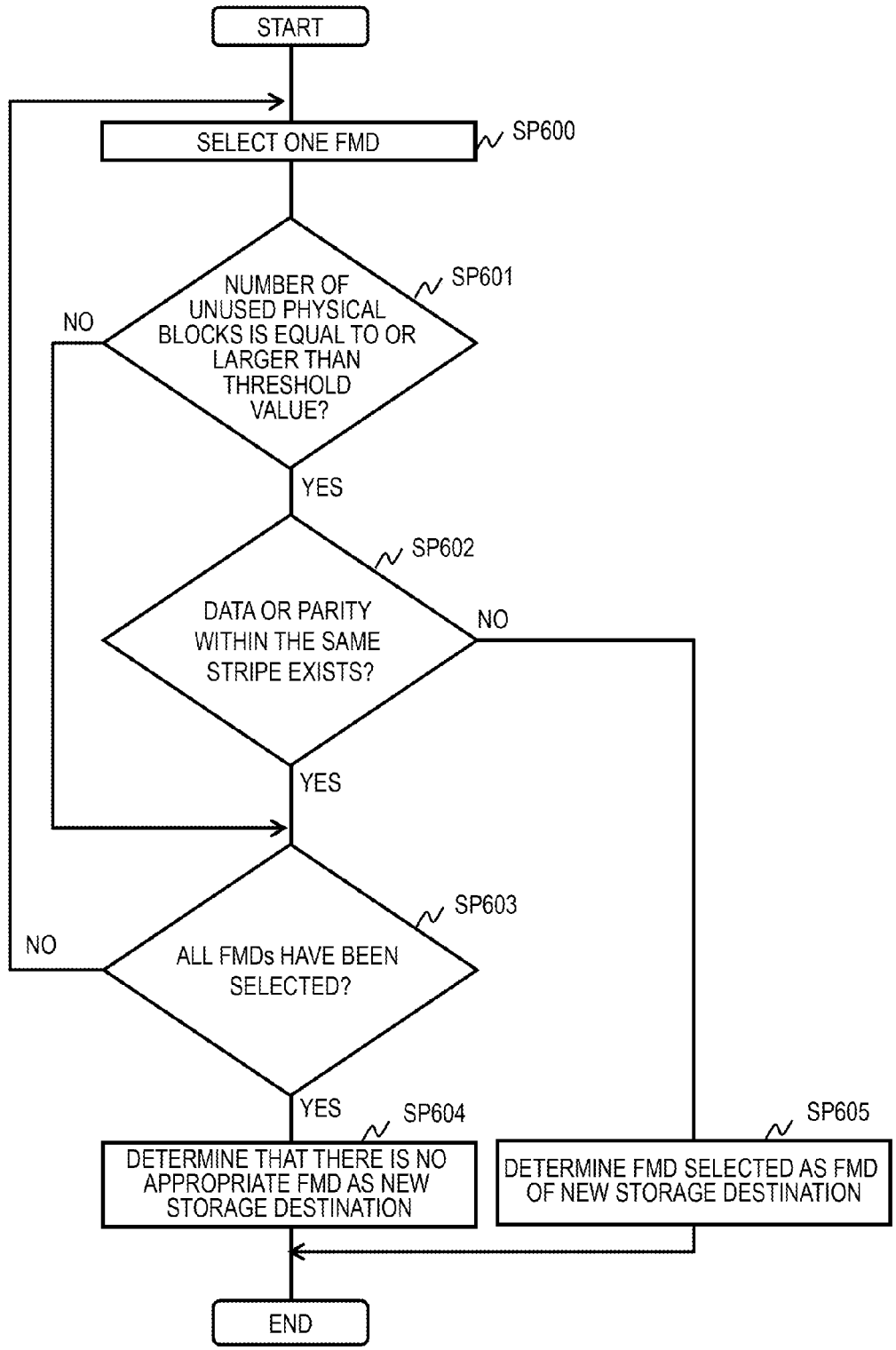
FIG. 11 is a flowchart for illustrating new-storage-destination FMD determination processing in the first embodiment.

FIG. 11 is a flowchart for illustrating processing (new-storage-destination FMD determination processing) conducted in order to determine the FMD 6 of the mapping changing destination when the RAID controller 5 changes the logical block 82 of the mapping destination of the virtual block 91. The new-storage-destination FMD determination processing is achieved when the CPU 51 of the RAID controller 5 executes a program.

In the new-storage-destination FMD determination processing, the RAID controller 5 first selects one FMD 6 as a candidate for the mapping changing destination (SP600). Specifically, the RAID controller 5 first refers to the RAID group management table 100 to identify an entry in which the virtual drive 9 including the virtual block 91 to be subjected to the changing of mapping destination is registered. Then, the RAID controller 5 selects one number from the numbers registered in the FMD #104 of the identified entry.

Subsequently, the RAID controller 5 determines whether or not the number of unused physical blocks 81 of the FMD 6 selected in Step SP600 is equal to or larger than a threshold value (SP601). Specifically, the RAID controller 5 queries the number of unused physical blocks 81 from the FMD 6 selected in Step SP600 to acquire the number of unused physical blocks 81 from the FMD 6, and determines whether or not the number of unused physical blocks 81 is equal to or larger than a predetermined threshold value. When the FMD 6 receives the query from the RAID controller 5, the CPU 71 of the FMD 6 reads the number of unused physical blocks 81 from the memory 72, and transmits the number to the RAID controller 5. When the number of unused physical blocks is smaller than the threshold value, it is highly probable that data cannot be stored in the FMD including the unused physical blocks, or that even when data can be stored, the number of unused physical blocks soon becomes smaller, which necessitates the leveling of the number of unused blocks. Therefore, the determination of Step SP601 is conducted in order to select the FMD having the number of unused physical blocks equal to or larger than the threshold value as the FMD of the new storage destination.

When obtaining a positive result in the above-mentioned determination (YES in SP601), the RAID controller 5 advances to Step SP602. Then, the RAID controller 5 determines whether or not another data or parity within the same stripe as the data to be subjected to the mapping changing exists in the FMD 6 selected in Step SP600. When a plurality of pieces of data and at least two parities within the same stripe are stored in the same FMD, redundancy is lowered. The determination of Step SP602 can prevent the FMD exhibiting lowered redundancy from being selected as the FMD of the new storage destination.

When obtaining a positive result in the above-mentioned determination (YES in SP602), the RAID controller 5 advances to Step SP603. Then, the RAID controller 5 determines whether or not all the FMDs 6 of the candidates for the mapping changing destination have been selected. Specifically, the RAID controller 5 determines whether or not all the numbers registered in the FMD #104 of the entry identified in Step SP600 have been selected.

When obtaining a positive result in the above-mentioned determination (YES in SP603), the RAID controller 5 advances to Step SP604 to determine that there is no appropriate FMD 6 as the new storage destination. In this case, the host read processing, the destaging processing, or the unused block leveling processing that has called the new-storage-destination FMD determination processing fails. At this point in time, the RAID controller 5 notifies the host computer 2 or the management computer 20 for the storage apparatus 4 of an alert for prompting the host computer 2 or the management computer 20 to add an FMD. This allows the administrator to know the timing to add the FMD 6.

After finishing Step SP604, the RAID controller 5 brings the new-storage-destination FMD determination processing to an end.

Meanwhile, when obtaining a negative result in the determination of Step SP601 (NO in SP601), the RAID controller 5 advances to Step SP603.

Meanwhile, when obtaining a negative result in the determination of Step SP602 (NO in SP602), the RAID controller 5 advances to Step SP605 to determine the FMD 6 selected in Step SP600 as the FMD 6 of the mapping changing destination.

Meanwhile, when obtaining a negative result in the determination of Step SP603 (NO in SP603), the RAID controller 5 advances to Step SP600.

In this manner, the RAID controller 5 and the FMD 6 exchange information in cooperation with each other, to thereby conduct the new-storage-destination FMD determination processing. The new-storage-destination FMD determination processing allows another appropriate FMD to be selected in order to make use of the physical block of an FMD that has not failed.

Second Embodiment

The first embodiment is described in regard to a configuration for associating the storage area within the RAID group formed of a plurality of virtual drives with the logical unit in a fixed manner. A second embodiment of this invention is described in regard to a configuration for dynamically assigning a storage area within a RAID group formed of a plurality of virtual drives to a virtual logical unit created through use of a so-called thin provisioning technology.

Figure 12:
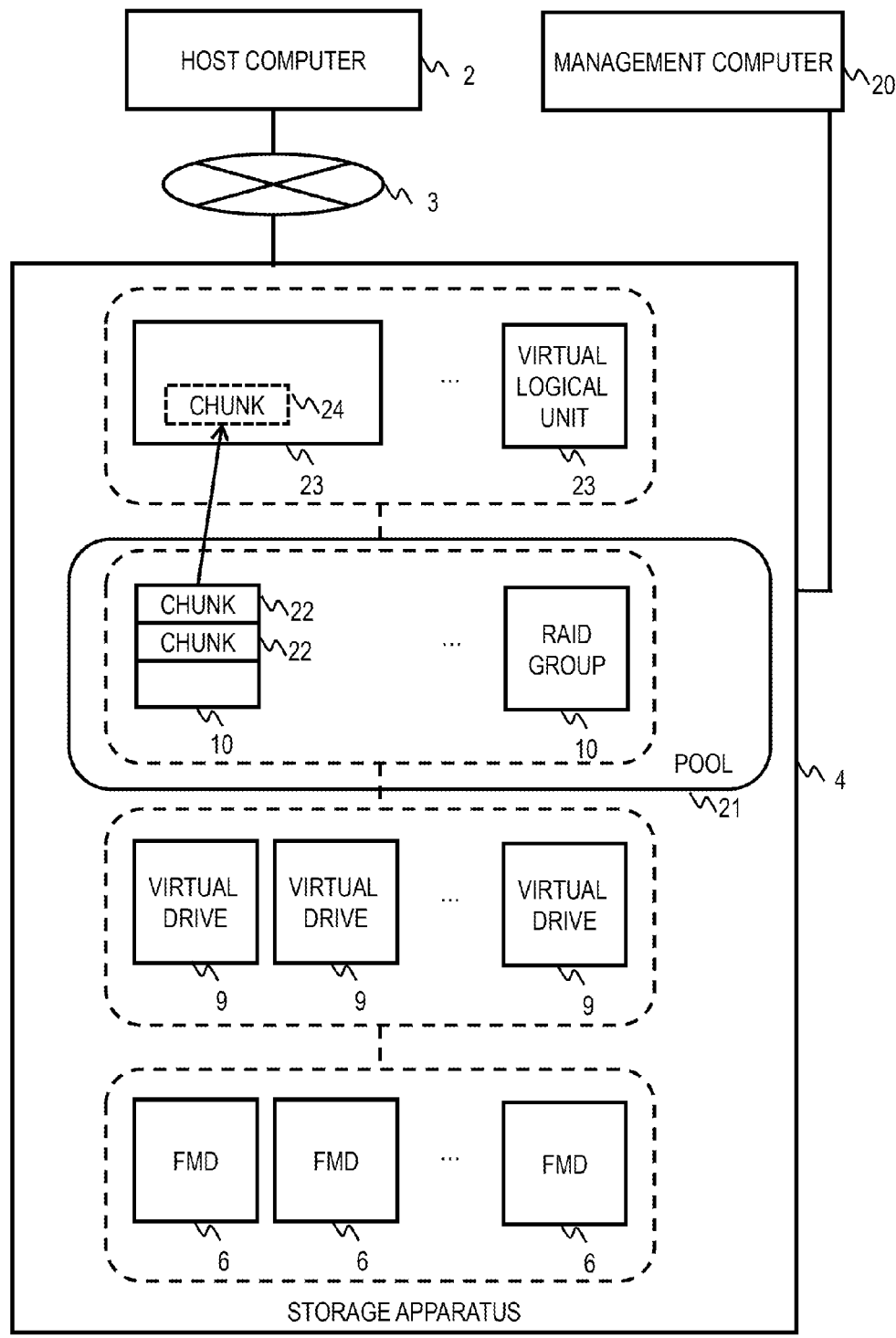
FIG. 12 is a diagram for illustrating an outline of a second embodiment.

FIG. 12 is a diagram for illustrating an outline of this embodiment. Descriptions of the same parts as those of the first embodiment are omitted.

In regard to a virtual logical unit (hereinafter referred to as "virtual logical unit 23") created by the thin provisioning technology, a specific storage area is not assigned to each area of the virtual logical unit 23 in an initial state. When receiving a write request that specifies a location (LBA) on the virtual logical unit 23 from the host computer 2, the RAID controller 5 verifies whether or not a storage area is assigned to the location, and when no storage area is assigned, assigns a storage area to the location.

The RAID controller 5 manages a storage space on the virtual logical unit 23 by dividing the storage space into a plurality of fixed size areas, and each fixed size area is referred to as "virtual chunk 24". In the second embodiment, as an example, the size of one virtual chunk is assumed to be equal to the size of one stripe.

Further, for the storage apparatus 4, a notion called "pool 21" is defined in order to manage the storage area of the RAID group 10 that can be assigned to the virtual chunk of the virtual logical unit 23. The RAID controller 5 manages the storage area of the RAID group 10 within the pool 21 by dividing the storage area into a plurality of fixed size areas, and each fixed size area within the pool 21 is referred to as "chunk 22". In the second embodiment, as an example, one chunk is assumed to include one stripe.

When assigning a storage area to the virtual logical unit 23 in response to the write request received from the host computer 2, the RAID controller 5 selects at least one chunk from among a plurality of chunks existing within the pool 21, and assigns the at least one chunk to the virtual logical unit 23.

FIG. 13 is an example of a structure of a pool management table 130 used for managing the storage area by the RAID controller 5. In the pool management table 130, a pool #131, a RAID group #132, a RAID level 133, a chunk #134, an assignment state 135, a virtual drive #136, and an FMD #137 are registered. Items other than the pool #131, the chunk #134, and the assignment state 135 are the same as those of FIG. 6, and hence descriptions thereof are omitted below.

The pool #131 is a number used for uniquely identifying a pool within the storage apparatus 4. As shown in FIG. 13, one pool includes at least one RAID group.

The chunk #134 is a number used for uniquely identifying a chunk within the pool 21. Each RAID group includes a plurality of chunks. Each chunk 22 is defined so as to cover a plurality of virtual drives that form the RAID group.

The assignment state 135 indicates whether each chunk 22 is assigned or unassigned to the virtual logical unit 23. When receiving the write request with respect to the virtual logical unit 23, the RAID controller 5 selects an unassigned chunk 22, and assigns the unassigned chunk 22 to the virtual logical unit 23.

FIG. 14 is an example of a structure of a virtual logical unit management table 140 for managing the storage area assigned to the virtual logical unit by the RAID controller 5. In the virtual logical unit management table 140, a virtual logical unit #141, a logical block address (LBA) 142, a virtual chunk #143, and an assigned chunk #144 are registered.

The virtual logical unit #141 is a number used for uniquely identifying the virtual logical unit 23 within the storage apparatus 4. The storage apparatus 4 includes at least one virtual logical unit 23.

The LBA 142 is a value for identifying a location on the virtual logical unit 23. The host computer 2 transmits the write request and the read request by specifying the LBA 142 on the virtual logical unit 23.

The virtual chunk #143 is a number used for uniquely identifying the virtual chunk 24 within the virtual logical unit 23. The RAID controller 5 divides LBAs on the virtual logical unit 23 by each predetermined range of LBAs to manage the LBAs as the virtual chunks 24.

The assigned chunk #144 indicates a number of the chunk 22 assigned to the virtual chunk 24. When the assigned chunk #144 is "unassigned", the assigned chunk #144 indicates that there is no chunk 22 assigned to the virtual chunk 24.

For example, when the write request that specifies the virtual logical unit #141 of "0" and the LBA 142 within a range of "1000-1999" is received from the host computer 2, no chunk 22 is assigned to the virtual chunk 24 corresponding to the above-mentioned LBA range, and hence the RAID controller 5 refers to the pool management table 130 to assign the unassigned chunk 22. Further, the RAID controller 5 can identify the RAID group 10 of the write destination from the chunk 22 of the write destination based on the pool management table 130.

In regard to the write processing and the read processing, processing other than the processing for identifying the correspondence relationship for the RAID group from the chunk 22 is the same as the processing of the first embodiment, and hence a description thereof is omitted.

The unused block leveling processing illustrated in FIG. 10 is the same as that of the first embodiment, and hence a description thereof is omitted.

In Step SP604 of the new-storage-destination FMD determination processing illustrated in FIG. 11, even when it is determined that there is no appropriate FMD 6 as the new storage destination, the RAID controller 5 can notify the management computer 20 of the alert that prompts the management computer 20 to add the FMD 6. Further, even when an appropriate FMD 6 exists as the new storage destination, when the capacity of the pool becomes equal to or smaller than a predetermined value, the RAID controller 5 may notify the management computer 20 that the capacity of the pool has becomes smaller. The capacity of the pool represents a total capacity by which the FMD 6 within the pool can store data. When there exists no FMD 6 as the new storage destination, the write processing and the read processing fail. The RAID controller 5 notifies the management computer 20 when the capacity of the pool becomes equal to or smaller than the predetermined value, to thereby allow the administrator to add the FMD 6 at an early stage before the capacity of the FMD 6 is used up.

Therefore, even with a configuration for assigning the storage area from the RAID group formed of a plurality of virtual drives to the virtual logical unit based on the thin provisioning, when a part of the blocks within the FMD fails, it is possible to effectively utilize a block that has not failed and to extend a period that allows the use of the FMD.

REFERENCE SIGNS

4: Storage apparatus
6: FMD (Flash Memory Device)

What is claimed is:

1. A storage apparatus, comprising:
a plurality of flash memory devices; and
a RAID controller, the plurality of flash memory devices each comprising:
a plurality of flash memory chips each comprising a plurality of physical blocks being data erasure units; and
a flash controller configured to provide logical storage areas by associating at least one of the plurality of physical blocks with the logical storage areas, wherein:
the RAID controller is configured to:
manage a plurality of virtual drives each comprising a part of the logical storage areas provided by each of the plurality of flash memory devices; and
control the plurality of virtual drives as a RAID group;
the plurality of flash memory devices comprise a first flash memory device comprising a first flash controller configured to notify the RAID controller of error information when detecting a failure in at least one physical block among the plurality of physical blocks; and
the RAID controller is configured to:
identify, when receiving the error information, a first logical storage area associated with the failed physical block;
restore data of the first logical storage area based on data and a parity relating to the data of the first logical storage area;
identify a first virtual storage area of a first virtual drive associated with the first logical storage area;
acquire a first number of unused physical blocks being a number of physical blocks that have caused no failure and are capable of storing data among the plurality of physical blocks from the first flash memory device;
acquire, when the first number of unused physical blocks is smaller than a predetermined first threshold value, a second number of unused physical blocks from a second flash memory device different from the first flash memory device;
determine, when the second number of unused physical blocks is equal to or larger than a predetermined second threshold value, that the logical storage area to be associated with the first virtual storage area of the first virtual drive is to be selected from the second flash memory device;
change a correspondence relationship between the first virtual storage area and the first logical storage area to a correspondence relationship between the first virtual drive and a second logical storage area of the second flash memory device; and
conduct writing to the second flash memory device by specifying the second logical storage area.

2. The storage apparatus according to claim 1, wherein the failure comprises at least one of a state in which a number of times of erasure of a given physical block is equal to or larger than a predetermined value and a state in which a failure has occurred in one of the plurality of flash memory chips comprising a given physical block.

3. The storage apparatus according to claim 2, wherein the first flash controller is configured to:
receive an access request from the RAID controller; and
notify the RAID controller of the error information when a failure has occurred in a physical block to be subjected to the access request.

4. The storage apparatus according to claim 3, wherein the first flash controller is configured to notify the RAID controller of the error information when detecting that a failure has occurred in at least one of the plurality of flash memory chips.

5. The storage apparatus according to claim 4, wherein the RAID controller is configured to:
acquire, when receiving the error information, a number of unused physical blocks being a number of physical blocks that have caused no failure and are capable of storing data among the plurality of physical blocks from one of the plurality of flash memory devices; and
select one of the plurality of flash memory devices comprising the logical storage areas to be associated with the first virtual drive based on the number of unused physical blocks.

6. The storage apparatus according to claim 1, wherein the RAID controller is configured to:
acquire a number of unused physical blocks from a second flash memory device among the plurality of flash memory devices; and
change, when the number of unused physical blocks of the second flash memory device is smaller than a first value, a correspondence relationship between a second virtual drive and the logical storage areas provided by the second flash memory device to a correspondence relationship between the second virtual drive and the logical storage areas provided by a third flash memory device having a larger number of unused physical blocks than a second value among the plurality of flash memory devices.

7. The storage apparatus according to claim 2, wherein the RAID controller is configured to provide a host computer with a logical unit based on the RAID group formed of the plurality of virtual drives.

8. The storage apparatus according to claim 1, wherein the RAID controller is configured to:
   provide a host computer with a virtual logical unit;
   divide a storage area of the RAID group formed of the plurality of virtual drives into a plurality of chunks; and
   assign one of the plurality of chunks to the virtual logical unit when receiving a write request with respect to the virtual logical unit from the host computer.

* * * * *